(12) United States Patent
Seemann et al.

(10) Patent No.: US 7,184,466 B1
(45) Date of Patent: Feb. 27, 2007

(54) RADIO FREQUENCY DATA CONVEYANCE SYSTEM INCLUDING CONFIGURABLE INTEGRATED CIRCUITS

(75) Inventors: Brian K. Seemann, Lakeville, MN (US); Brian T. Brunn, Austin, TX (US); Normand T. Lemay, Jr., Minneapolis, MN (US); Daniel J. Ferris, III, Lakeville, MN (US); Thomas Anthony Lee, Lakeville, MN (US); James M. Simkins, Park City, UT (US); David B. Squires, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 688 days.

(21) Appl. No.: 10/243,411

(22) Filed: Sep. 12, 2002

(51) Int. Cl.
*H04B 1/38* (2006.01)
(52) U.S. Cl. ............................... 375/219
(58) Field of Classification Search ............... 375/219, 375/316, 271, 220, 260, 285, 295; 455/570, 455/278, 419; 370/503, 535, 542
See application file for complete search history.

(56) References Cited

U.S. PATENT DOCUMENTS

| | | | | |
|---|---|---|---|---|
| 4,145,657 A | * | 3/1979 | Hanni | 370/345 |
| 5,260,703 A | * | 11/1993 | Nguyen et al. | 341/100 |
| 5,617,401 A | * | 4/1997 | Hurst, Jr. | 369/47.52 |
| 5,920,284 A | * | 7/1999 | Victor | 342/357.01 |
| 6,028,850 A | * | 2/2000 | Kang | 370/320 |
| 6,052,729 A | * | 4/2000 | Robinson | 709/224 |
| 6,323,793 B1 | * | 11/2001 | Howald et al. | 341/137 |
| 6,327,709 B1 | * | 12/2001 | Ovadia et al. | 725/124 |
| 6,370,187 B1 | * | 4/2002 | Agah | 375/219 |
| 6,404,810 B1 | * | 6/2002 | Girardeau et al. | 375/232 |
| 6,556,239 B1 | * | 4/2003 | Al-Araji et al. | 348/192 |

(Continued)

FOREIGN PATENT DOCUMENTS

WO WO 99/23588 5/1999

OTHER PUBLICATIONS

David Nicklin; "Reconfigurable Basestations & Software Radios Utilising FPGAs"; electronic engineering; Jun. 1999; pp. 65-67.

(Continued)

*Primary Examiner*—Khanh Tran
(74) *Attorney, Agent, or Firm*—H. C. Chan; Kim Kanzaki; Michael Wallace

(57) ABSTRACT

A data conveyance integrated system that can be utilized in a base station and/or end user devices in a wireless communication system. The integrated system includes first and second integrated circuits (ICs). The first IC includes a first serial-deserial (SERDES) module, a transmit radio frequency module, and a receive radio frequency module. The transmit and receive radio frequency modules provide the wireless communication between the base stations and end user devices. The second IC includes a second SERDES module and a programmable logic fabric programmed to implement one or more wireless communication functions. Accordingly, the programmable logic fabric generates outbound digital signals from data (e.g., video, audio, control, or text data) provided to the device, and/or processes inbound digital signals to recapture the originally transmitted data. Thus, base stations and/or end user devices within a wireless communication system can be readily reconfigured.

20 Claims, 8 Drawing Sheets

U.S. PATENT DOCUMENTS

| | | | |
|---|---|---|---|
| 6,567,489 B1* | 5/2003 | Glover | 375/376 |
| 6,647,075 B1* | 11/2003 | Genrich | 375/316 |
| 6,891,841 B2* | 5/2005 | Leatherbury et al. | 370/401 |
| 6,937,054 B2* | 8/2005 | Hsu et al. | 326/30 |
| 6,947,773 B2* | 9/2005 | Novorita et al. | 455/570 |
| 2002/0122503 A1* | 9/2002 | Agazzi | 375/316 |
| 2003/0026202 A1* | 2/2003 | Aschermann | 370/216 |
| 2003/0043141 A1* | 3/2003 | Bae et al. | 345/211 |
| 2003/0050055 A1* | 3/2003 | Ting et al. | 455/419 |
| 2003/0081668 A1* | 5/2003 | Yousef et al. | 375/232 |
| 2003/0112881 A1* | 6/2003 | Cox et al. | 375/260 |
| 2004/0157578 A1* | 8/2004 | Auranen | 455/278.1 |
| 2005/0088969 A1* | 4/2005 | Carlsen et al. | 370/229 |

OTHER PUBLICATIONS

Beth Logan; "Pre-Test SERDES To Smooth Integration in Fast ASICs"; May 26, 2003; downloaded from http://www.elecdesign.com/Articles/Print.cfm?ArticleID==3538; downloaded Sep. 10, 2003; two pages.

* cited by examiner second integrated circuit 220

US 7,184,466 B1

RADIO FREQUENCY DATA CONVEYANCE SYSTEM INCLUDING CONFIGURABLE INTEGRATED CIRCUITS

TECHNICAL FIELD OF THE INVENTION

This invention relates generally to radio frequency (RF) communication systems and more particularly to a data conveyance system within RF communication systems that includes configurable integrated circuits.

BACKGROUND OF THE INVENTION

Radio frequency (RF) wireless communication systems are known to include a plurality of end user devices (e.g., radios, cellular telephones, fixed wireless telephones, pagers, personal digital assistants (PDA's), et cetera), a plurality of base stations, and at least one central site. As is also known, the base stations are located throughout a given geographic area to provide wireless coverage for the geographic area. Each base station using a set of carrier frequencies to support wireless communications, where the total number of carrier frequencies is distributed among the base stations in a cell pattern to prevent interference.

As is further known, each end user device may be affiliated with a particular base station or roam from base station to base station. To communicate with end user devices, each base station transmits control information over a wireless control channel via an antenna. The control information identifies end user devices that are targets of wireless communications, identifies wireless working channel that supports the wireless communications, etc. Each end user device within the coverage area of the base station receives and processes the control information to determine whether it is one of the targeted end user devices. If the end user device is a target, it switches to the assigned wireless working channel to participate in the wireless communication.

The end user devices also use the control channel to initiation a wireless communication. Accordingly, the end user device transmits, via the wireless control channel, a request for a communication to the base station. The request includes a request for a wireless working channel, the identity of the requesting end user device, and the identity of the target end user device or devices. The base station processes the request by determining whether a wireless working channel is available and whether the target end user device(s) is within the coverage area of the base station. If so, the base station fulfills the request. If the target end user device is not within the coverage area of the base station, the base station forwards the request to the central site, which processes the request to identify the target end user device's location and forwards the request to the base station servicing that location. If a wireless working channel is not available, the request is denied.

The coverage area of a wireless communication system may vary from a single room within a home or office building to the entire globe. Regardless of the size of the coverage area, each end user device and base station includes a radio frequency transceiver and processing circuitry. The RF transceiver provides wireless connectivity between the end users and the base stations. The processing circuitry processes communications in accordance with the type of wireless protocol being used within the system. For instance, the processing circuitry may perform code division multiplexing access (CDMA), time division multiple access (TDMA), frequency division multiple access (FDMA), Personal Communications Service (PCS), Global System for Mobile Communications (GSM), quadrature amplitude modulation (QAM), et cetera.

To help reduce costs and increase performance, many companies have developed RF applications specific integrated circuits (ASIC) that increase data throughput, provide transceiver functionality, provide receiver functionality, and/or provide more effective antenna utilization. While such ASICs reduce costs and increase performance of RF communications, the design and manufacture of such ASICs lag the ever-increasing demand for better performance and/or greater flexibility in RF circuitry.

Therefore, a need exists for an RF communication system that can meet the ever-increasing demands for performance and/or flexibility.

DETAILED DESCRIPTION OF A PREFERRED EMBODIMENT

Figure 1:
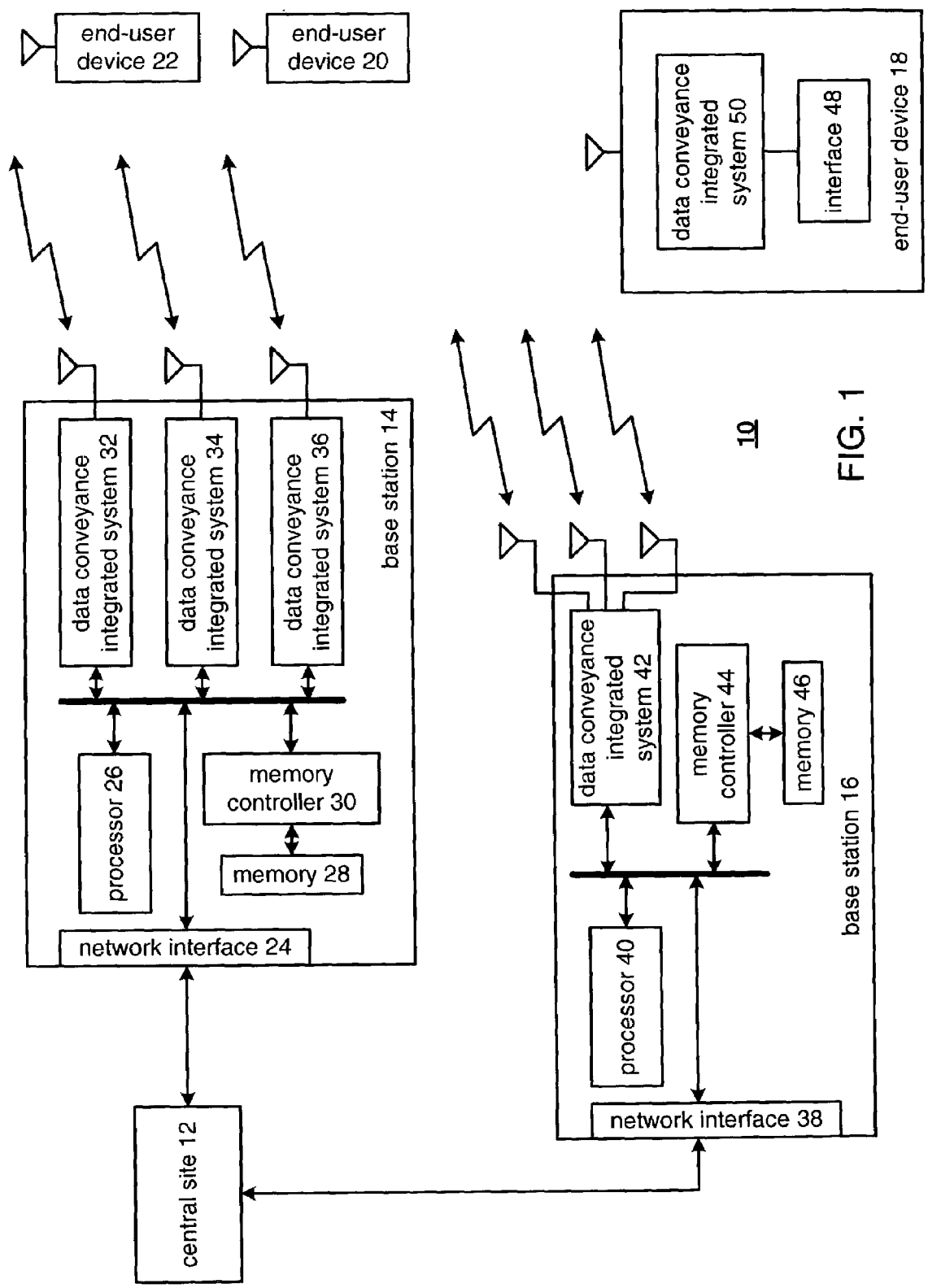
FIG. 1 illustrates a schematic block diagram of a wireless communication system that includes a data conveyance integrated system in accordance with the present invention.

Generally, the present invention provides a data conveyance integrated system that may be utilized in a base station of a wireless communication system and/or within end user devices within a wireless communication system. The data conveyance integrated system includes a $1^{st}$ integrated circuit and a $2^{nd}$ integrated circuit. The $1^{st}$ integrated circuit includes a $1^{st}$ serial-deserial (SERDES) module, a transmit radio frequency module, and/or a receive radio frequency module. The transmit and receive radio frequency modules provide the wireless communication between devices (i.e., base stations and end user devices) within a wireless communication system.

The $2^{nd}$ integrated circuit includes a $2^{nd}$ SERDES module and programmable logic fabric. The programmable logic fabric may be a mask or field programmable gate array, mask or field programmable logic device, mask or field programmable array logic, and/or any other type of configurable logic circuitry. The programmable logic fabric is programmed to implement one or more wireless communication functions including software defined radio functions, CDMA, TDMA, GSM, PCS, etc. Accordingly, based wireless RF programming, the programmable logic fabric generates outbound digital signals from video, audio, control, and/or text data that was inputted into the device.

The $2^{nd}$ integrated circuit provides the outbound digital signals as a serial bit stream, via its SERDES, to $1^{st}$ SERDES of the $1^{st}$ integrated circuit. The $1^{st}$ SERDES de-serializes the serial bit stream to recapture the outbound digital signals and provides them to the transmit radio frequency module. The transmit RF module converts, based on the RF convention of the system (e.g., carrier frequency, half duplex, full duplex, intermediate frequency, etc.), the digital signals into radio frequency signals that are subsequently transmitted via an antenna to another device within the wireless communication system.

The receive radio frequency module of the $1^{st}$ integrated circuit receives inbound RF signals from another device within a wireless communication system (e.g., from a base station or from an end user device). The receive radio frequency module converts, based on the RF convention of the system, the inbound RF signals into inbound digital signals. The $1^{st}$ SERDES of the $1^{st}$ integrated circuit converts the inbound digital signals into an inbound serial bit stream that is provided to the $2^{nd}$ SERDES of the $2^{nd}$ integrated circuit. The $2^{nd}$ SERDES converts the inbound serial bit stream back into the inbound digital signals, which are provided to the programmable logic fabric. The programmable logic fabric, based on the wireless communication application, processes the inbound digital signals to recapture the originally transmitted audio, video, control, and/or text data. With such an integrated data conveyance system, base stations and/or end user devices within a wireless communication system may be readily reconfigured to keep up with the ever increasing demands for higher performance and/or for more flexible wireless communication devices.

The present invention can be more fully described with reference to FIGS. 1 through 8. FIG. 1 illustrates a schematic block diagram of a wireless RF communication system 10 that includes a central site 12, a plurality of base stations 14 and 16, and a plurality of end user devices 18–22. The wireless communication system 10 may be an in-home wireless communication system, an in-office wireless communication system, a wireless communication system within a neighborhood such as a cellular telephone and/or LAN mobile system, and/or a network of cellular telephone systems and/or LAN mobile systems to provide nationwide and/or worldwide coverage. Within each type of wireless communication system, the base stations are located provide continuous wireless coverage for the geographic area of the system.

As one of average skill in the art will appreciate, a wireless communication system may include a single base station and a single end user device, a single base station and a plurality of end user devices, or a plurality of base stations and end user devices. For example, the wireless communication system may be a cordless telephone where the base station performs the base station functions of a cordless telephone and the end user device performs the handset function. Alternatively, the wireless communication system may be an in-home networking system where the base station acts as the hub for the home where the plurality of end user devices include personal computers with wireless modems, PDAs with wireless modems, wireless telephones, et cetera.

The end user devices 18–22 may be mobile radios, cellular telephones, fixed wireless telephones, PDAs (personal digital assistant), and/or any other device that transceives data (voice, text, control, and/or video) via a wireless communication path. Such end user devices 18–22 may include a data conveyance integrated system 50 and an interface 48. The interface 48, which may be a keyboard, touch screen, microphone, speaker, LCD or CRT display, graphical user interface, etc. provides interfacing capabilities to input/output voice, text, control, and/or video data that is transceived via RF communication paths. The data conveyance integrated system 50 provides the connectivity to the RF communication paths for the transceiving the data. In addition, the data conveyance system 50 may be readily reconfigured to accommodate one or more wireless communication protocols without the need for replacing ASICs, or requiring new hardware to be purchased. The data conveyance integrated system 50 will be described in greater detail with reference to FIGS. 2–8. As one of average skill in the art will appreciate, the end user devices 18–22 include conventional radio, cellular telephone, wireless PDA, et cetera, circuitry.

The plurality of base stations 14 and 16 may be of a variety of configurations. For example, base station 14 includes a plurality of data conveyance integrated systems 32–36, each associated with a different transmit and/or receive antenna, a processor 26, a network interface 24, memory 28 and a memory controller 30. Each of the components within base station 14 is operably coupled together via a bus. The network interface 24 provides the base station 14 with connectivity to the central site 12. As such, the network interface 24 provides the physical and/or network layering connection between the base station 14 and the central site 12.

The data conveyance integrated systems 32–36 provide the base station 14 with field programmable RF circuitry thus making the base station capable of being programmed, in the field, to facilitate multiple standards and to enable application optimization. In addition, the data conveyance integrated systems 32–36 allow the base station to leverage programmable gate array software defined radio capabilities thereby allowing the base station to be readily reconfigured to provide the most current standards, to include multiple software defined radio applications, et cetera. In addition, each of the data conveyance integrated systems 32–36 may be programmed in accordance with the same wireless communication standard (i.e., all using the same RF conventions) or different wireless communication standards (i.e., using different RF conventions). As such, the data conveyance integrated system 32 may be programmed to support an RF convention as defined by the standards for software defined radio, Bluetooth, 802.11b, Local Multipoint Distribution System (LMDS), Microwave Multipoint Distribution System (MMDS), 802.16.3, hiperLAN, 802.11a, CDMA, FDMA, TDMA, PCS, GSM, et cetera. Similarly, the data conveyance integrated system 34 and/or 36 may be configured to provide one or more wireless communication standards.

The processor 26 performs typical base station algorithms, which are stored in memory 28 to achieve the connectivity between the central site 12 and the plurality of end user devices supported by base station 14. Such base station functionality is known, thus no further discussion will be presented except to facilitate the understanding of the present invention.

Base station 16 illustrates a different topology wherein a data conveyance integrated system 14 is operably coupled to a plurality of antennas that provide transmission and/or reception of wireless communications. The base station 16 further includes a memory controller 44, memory 46, processor 40 and a network interface 38. The network interface 38 provides connectivity between base station 16 and central site 12 and includes the physical layer and/or network layer protocol to support such a connection. The processor 40 performs typical base station functions, which are stored as programs in memory 46.

The data conveyance integrated system 42 may support one or more wireless communication standards per antenna connection. As such, one antenna may be utilized to support software defined radio, CDMA, FDMA, TDMA, GSM, PCS, QAM, Bluetooth, 802.11a, LMDS, MMDS, 802.16.3, hiperLAN, 802.11a, et cetera while the other antennas support another type of wireless communication. The details of data conveyance integrated system 32–36 and 42 are further described with reference to FIGS. 2–8.

Figure 2:
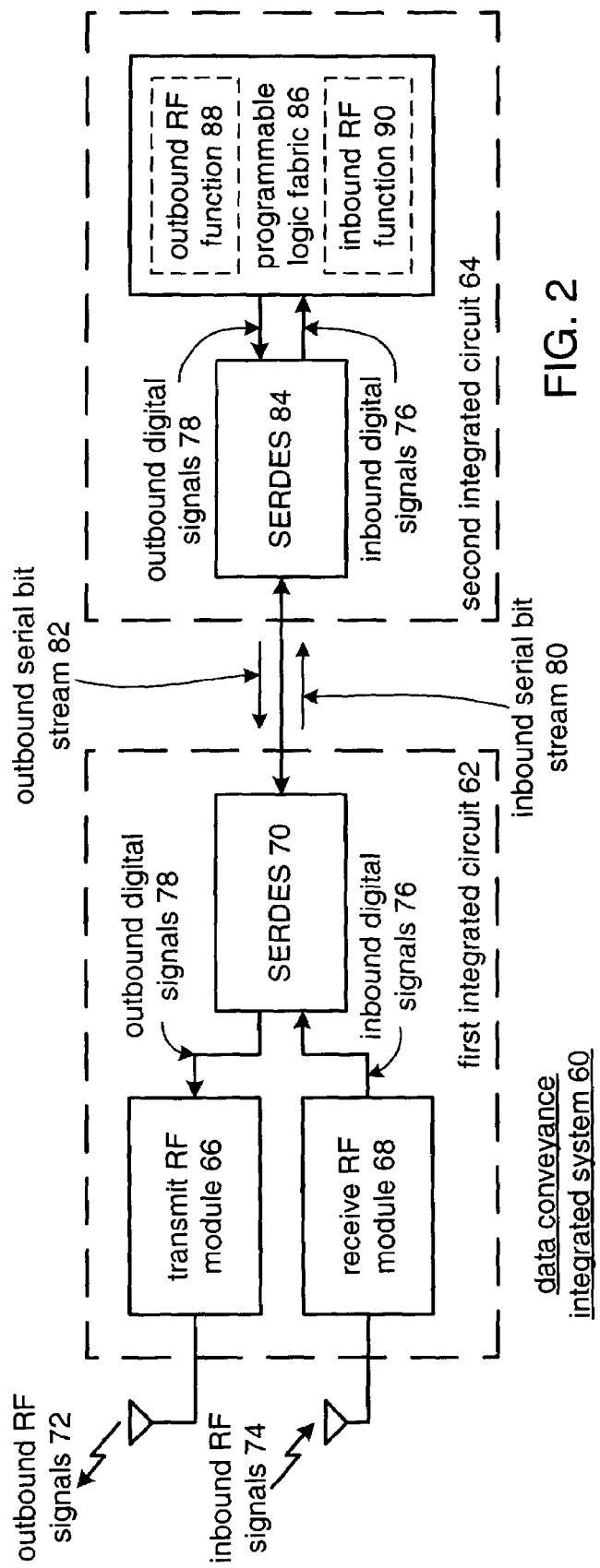
FIG. 2 illustrates a schematic block diagram of a data conveyance integrated system in accordance with the present invention.

FIG. 2 illustrates a schematic block diagram of a data conveyance integrated system 60 that may be utilized as any one of the data conveyance integrated systems 32–36, 42 and 50. The data conveyance integrated system 60 includes a $1^{st}$ integrated circuit 62 and a $2^{nd}$ integrated circuit 64. The $1^{st}$ integrated circuit 62 includes a $1^{st}$ serial-deserial (SERDES) module 70, a receive RF module 68 and a transmit RF module 66. The $2^{nd}$ integrated circuit 64 includes a $2^{nd}$ SERDES module 84 and programmable logic fabric 86. The programmable logic fabric 86 is programmed to perform an outbound RF function 88 and an inbound RF function 90, which are in accordance with the RF convention(s) supported by the device.

As shown, the receive module 68 is operably coupled to receive inbound RF signals 74, which may be transmitted from an end user device 18–22 when the data conveyance integrated system 60 is included in base station 14 or 16, or from base station 14 or 16 when the data conveyance integrated system 60 is included in an end user device 18–22. The receive RF module 68 converts the inbound RF signal 74 into inbound digital signals 76 in accordance with the RF convention utilized by the data conveyance integrated system 60. The particular type of RF convention, as previously mentioned, may be software defined radio, CDMA, FDMA, TDMA, GSM, PCS, QAM, Bluetooth, 802.11a, LMDS, MMDS, 802.16.3, hiperLAN, 802.11a, et cetera.

The inbound digital signals 76 include a plurality of digital words that are provided to SERDES 70. SERDES 70 converts the inbound digital signals 76 into an inbound serial bit stream 80. SERDES 84 of the $2^{nd}$ integrated circuit 64 receives the inbound serial bit stream 80 and recaptures the inbound digital signals 76. The programmable logic fabric 86, via the inbound RF function 90, processes the inbound digital signal 76 to produce resultant data. The resultant data may be voice, text, control, and/or video data depending on the original data of the wireless communication. In addition, the inbound RF function 90 will be dependent on the particular RF convention being utilized which may be, as previously mentioned, software defined radio, CDMA, FDMA, TDMA, GSM, PCS, QAM, Bluetooth, 802.11a, LMDS, MMDS, 802.16.3, hiperLAN, 802.11a, et cetera. The details of each of these RF conventions is known, thus no further discussion will be presented except to further illustrate the present invention.

The programmable logic fabric 86, based on the outbound RF function 88, generates outbound digital signals 78 from data inputted to the device (e.g., base station or end user device) of the wireless communication system. The SERDES 84 receives the outbound digital signals 78 and converts them into an outbound serial bit stream 82. SERDES 70 of the $1^{st}$ integrated circuit 62 receives the outbound serial bit stream 82 and recaptures the outbound digital signal 78. The transmit RF module 66 receives the outbound digital signal 78 and converts them into outbound RF signal 72. The conversion of the outbound digital signal 78 into outbound RF signal 72 is dependent on the RF convention utilized by the data conveyance integrated system.

As one of average skill in the art will appreciate, the coupling between the $1^{st}$ and $2^{nd}$ integrated circuits may be done utilizing a wire line connection, an infrared connection, an optical connection, et cetera. If the coupling between the $1^{st}$ and $2^{nd}$ integrated circuits 62 and 64 is an RF immune high-speed fiber optic link, the $1^{st}$ integrated circuit may be mounted on the mast of the antenna while the $2^{nd}$ integrated circuit is mounted within the base station box.

As one of average skill in the art will further appreciate, the antenna coupled to the transmit RF module and the receive RF module may be separate antennas, or may be a single antenna that is switched between the transmit module 66 and the receive module 68 based on control signals received via SERDES 70 and generated by the programmable logic fabric 86.

Figure 3:
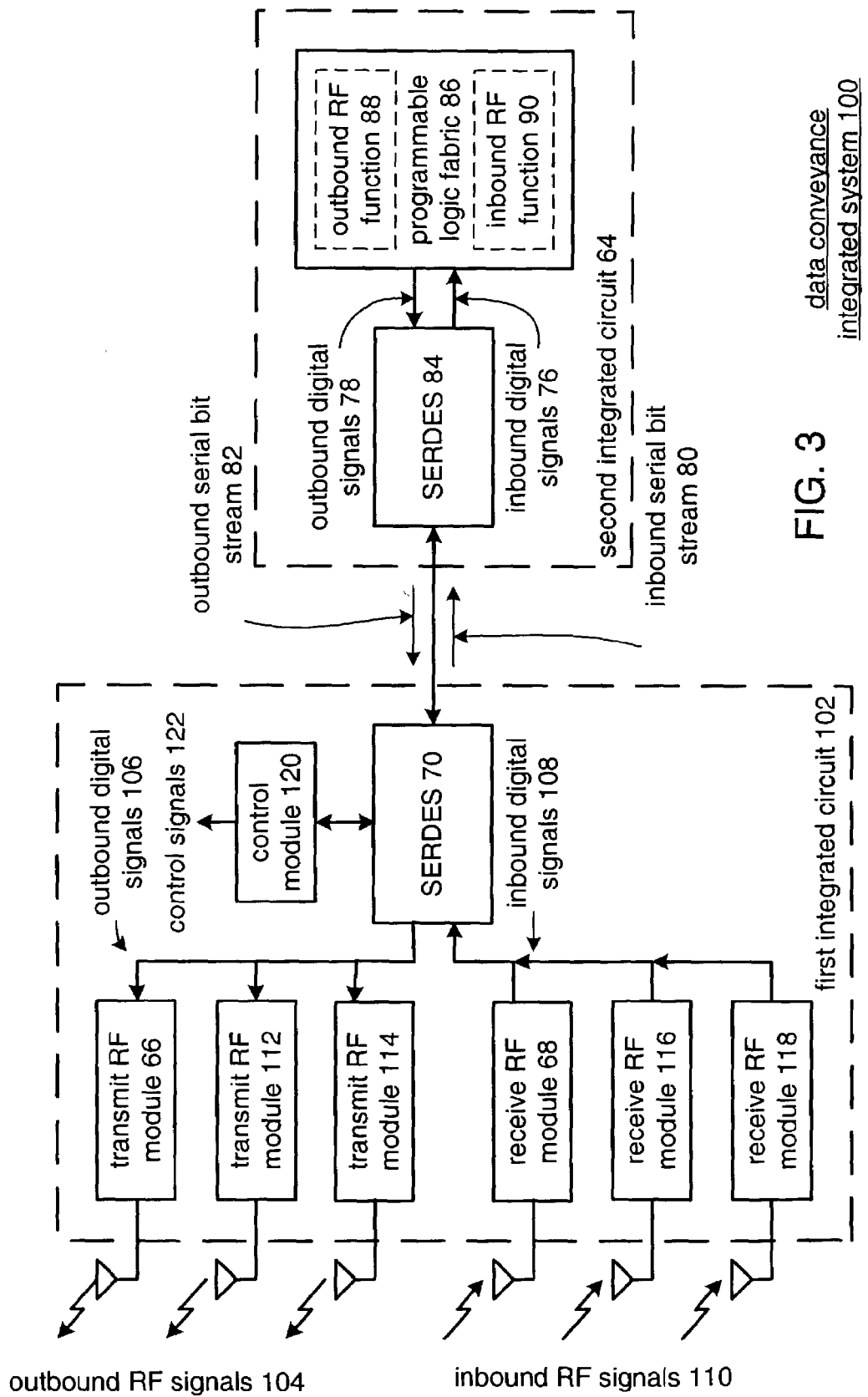
FIG. 3 illustrates a schematic block diagram of an alternate data conveyance integrated system in accordance with the present invention.

FIG. 3 illustrates a schematic block diagram of an alternate data conveyance integrated system 100. The data conveyance integrated system 100 may be utilized in either of the base stations 14 or 16 and/or in the end user devices 18–22 of FIG. 1 for the data conveyance integrated systems 32–36, 42 and 50. The data conveyance integrated system 100 includes a $1^{st}$ integrated circuit 102 and a $2^{nd}$ integrated circuit 64. The $2^{nd}$ integrated circuit 64 includes the SERDES module 84 and the programmable logic fabric 86. The programmable logic fabric 86 is programmed to perform an inbound RF function 90 and an outbound RF function 88 in accordance with the particular RF convention(s) utilized within the system. As previously mentioned, such RF conventions include software defined radio, CDMA, FDMA, TDMA, GSM, PCS, QAM, Bluetooth, 802.11a, LMDS, MMDS, 802.16.3, hiperLAN, 802.11a, et cetera.

The $1^{st}$ integrated circuit 102 includes a plurality of transmit RF modules 66, 112 and 114, a plurality of receive RF modules 68, 116 and 118, SERDES module 70, and a control module 120. The SERDES 70 exchanges outbound serial bit stream 82, inbound serial bit stream 80 and serial control data with SERDES 84. The serial control data is produced by the programmable logic fabric 86 to configure each of the transmit RF modules 66, 112 and 114 and the receive RF modules 68, 116 and 118 in accordance with the particular RF convention to be supported by each of the receive and transmit RF modules. The SERDES module 70 provides the control information to control module 120, which produces control signals 122 therefrom. The control signals 122 are provided to one or more of the transmit RF modules and one or more of the receive RF modules. Based on the control signals, the transceive modules configure themselves (i.e., adjusts one or more operational parameters) to perform one or more of the RF conventions dictated by the control signal.

SERDES module 70 also receives inbound digital signals 108 from the plurality of RF modules 68, 116, and 118. The RF receive modules generate the inbound digital signals 108 from inbound RF signals 110. The inbound RF signals 110 may be representative of transmissions from end user devices and/or base stations within a wireless communication system. As one of average skill in the art will appreciate, each of the inbound RF signals 110 may be in accordance with a different RF convention supported by the wireless communication system or the same RF convention. The SERDES module 70 provides the inbound digital signals 108 as the inbound serial bit stream 80 to the SERDES module 84 of the 2nd integrated circuit 64.

SERDES module 70 also receives the outbound serial bit stream 82 from the SERDES module 84 of the 2nd integrated circuit 64 and produces, therefrom, outbound digital signals 106. The outbound digital signals 106 are provided to the plurality of transmit RF modules 66, 112 and 114. Each of the transmit modules identifies the portions of the outbound digital signals 106 that it is to convert into outbound RF signals 104. Accordingly, the control signals 122 may indicate which portions of the outbound digital signals 106 are to be transmitted by a particular transmit module, and/or the outbound digital signals 106 includes header information that addresses a particular transmit module. Similarly, the inbound digital signals will include addressing to identify the particular receive RF module providing the inbound digital signals.

As one of average skill in the art will appreciate, the transmit modules may communicate via a shared bus with the SERDES module 70. Access to the shared bus may be done in accordance with carrier sense multiple access (CSMA), TDMA access, and/or any other form of accessing a shared bus. Alternatively, each of the transmit modules may have a separate connection with the SERDES module 70. Similarly, the receive RF modules 68, 116 and 118 may have a shared bus with respect to SERDES module 70. Alternatively, each of the receive RF modules may have a separate connection with SERDES module 70. As a further alternative, each of the transmit modules and receive modules may share a single bus with the SERDES module 70. Accordingly, SERDES module 70 processes in accordance with an interface convention with the 2nd integrated circuit to insure that the inbound digital signals 108 and outbound digital signals 106 are processed appropriately. The interface convention the formatting of when and how data is to be sent and/or received from the various sources via the SERDES module 70 and SERDES module 84.

Figure 4:
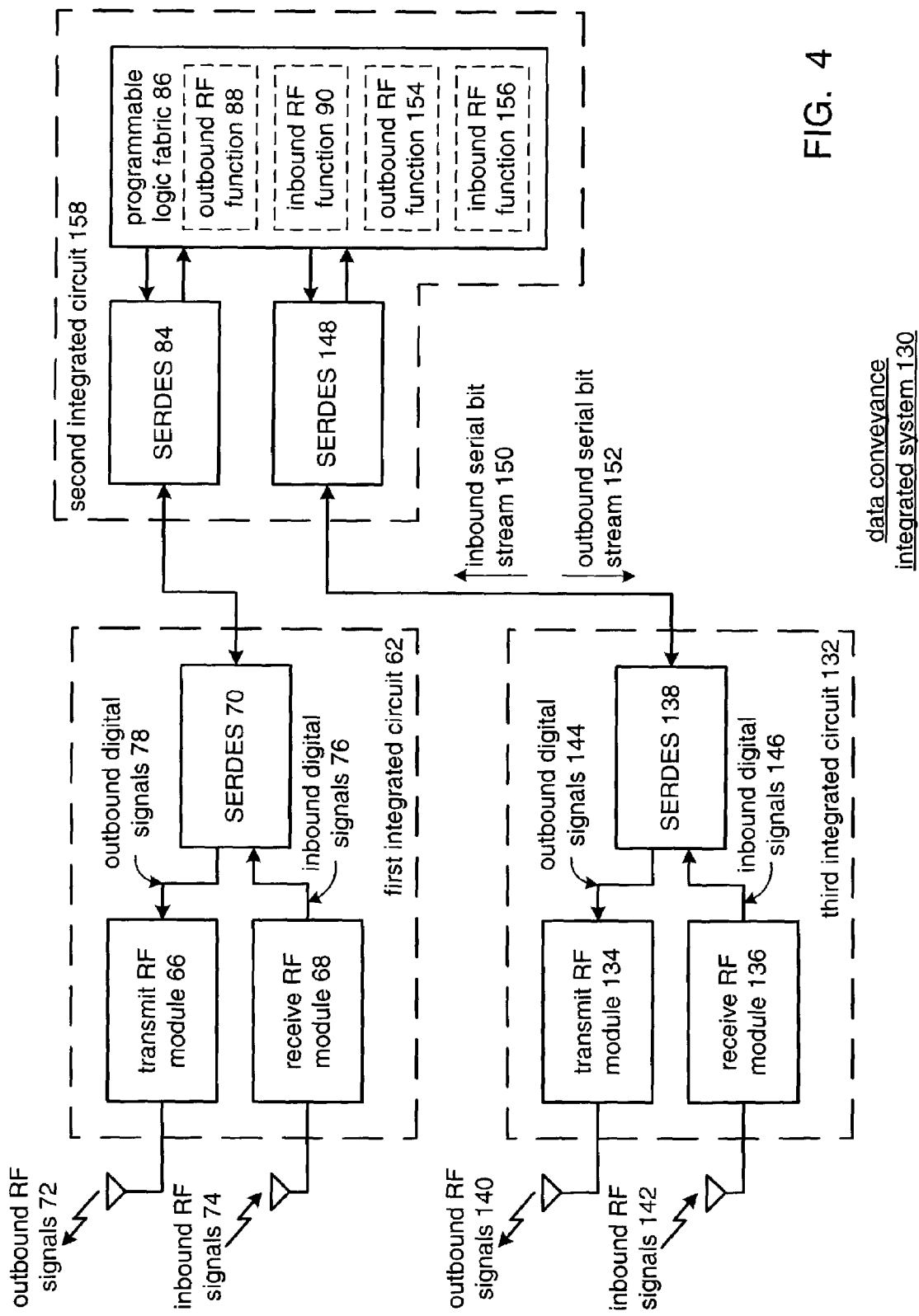
FIG. 4 illustrates a schematic block diagram of a further alternate data conveyance integrated system in accordance with the present invention.

FIG. 4 illustrates a schematic block diagram of an alternate embodiment of a data conveyance integrated system 130. The data conveyance integrated system 130 may be utilized for any of the data conveyance integrated systems 32–36, 42 and/or 50 as shown in FIG. 1. The data conveyance integrated system 130 includes a 1st integrated circuit 62, a 2nd integrated circuit 158, and a 3rd integrated circuit 132. The 1st integrated circuit 62 includes the SERDES module 70, the transmit RF module 66 and the receive RF module 68. The functionality of these modules is as previously discussed with reference to FIG. 2.

The 3rd integrated circuit 132 includes a SERDES module 138, a transmit RF module 134 and a receive RF module 136. The functionality of these module is substantially equivalent to the corresponding modules in the first integrated circuit 62.

The 2nd integrated circuit 158 includes SERDES module 84, the programmable logic fabric 86, and a 2nd SERDES module 148. The programmable logic fabric 86 is programmed to perform a 1st outbound RF function 88, a 1st inbound RF function 90, a 2nd outbound RF function 154 and a 2nd inbound RF function 156. Such inbound and outbound RF functions may be in accordance with the RF convention(s) being utilized within the wireless communication system. Such RF conventions include software defined radio, CDMA, FDMA, TDMA, 802.11B, 02.11A, 802.16.3, hiperLAN, LMDS/MMDS, et cetera. For example, the 1st inbound and outbound RF functions 88 and 90 may utilize a 1st RF convention to interface with the 1st integrated circuit 62 while the 2nd inbound and outbound RF functions 154 and 156 utilize a different RF convention to interface with the 3rd integrated circuit 132.

As configured, SERDES 138 exchanges inbound serial bit streams 150 and outbound serial bit stream 152 with SERDES module 148. The outbound serial bit stream 152 is representative of digital signals that are to be transmitted via the data conveyance system. The SERDES module 138 receives the outbound serial bit stream 152 and recaptures outbound digital signals 144. The transmit RF module 134 receives the outbound digital signals 144 and produces therefrom outbound RF signals 140.

The receive RF module 136 receives inbound RF signals 142 and produces therefrom inbound digital signals 146. The SERDES module 138 receives the inbound digital signals 146 and converts them into the inbound serial bit stream 150. As such, the data conveyance integrated system 130 may facilitate a smart antenna array wherein the programmable logic fabric 86 includes steering algorithms to direct the appropriate data to the appropriate antenna array. As one of average skill in the art will appreciate, each transmit and receive module 66, 68, 134 and 136 may be operably coupled to a separate antenna and/or a shared antenna where the sharing is controlled by the 2nd integrated circuit via an antenna switch.

Figure 5:
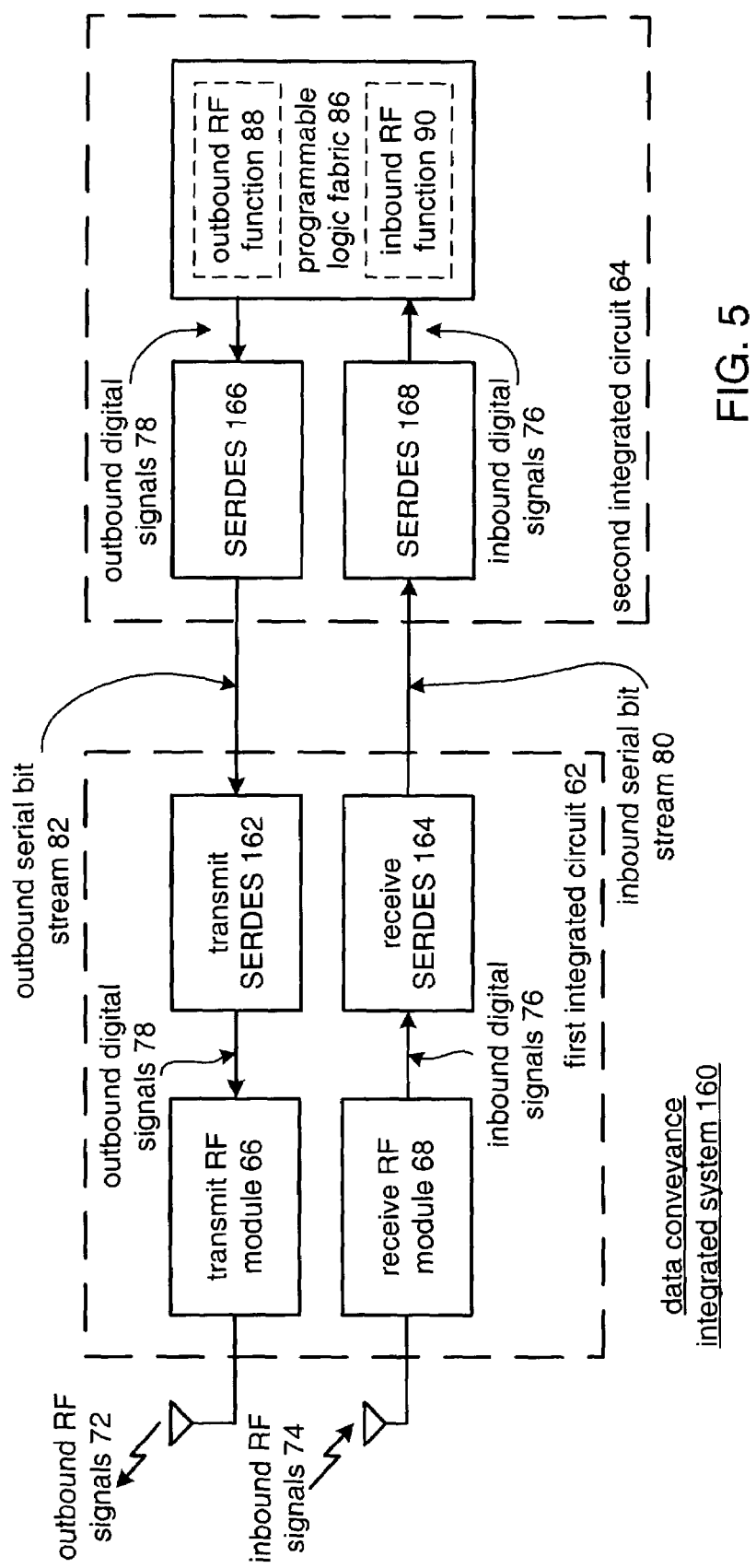
FIG. 5 illustrates a schematic block diagram of yet another data conveyance integrated system in accordance with the present invention.

FIG. 5 illustrates a schematic block diagram of yet another data conveyance integrated system 160. The data conveyance integrated system 160 may be utilized to implement any one of the data conveyance integrated systems 32–36, 42 and/or 50 of FIG. 1. The data conveyance integrated system 160 includes a 1st integrated circuit 62 and a 2nd integrated circuit 64.

The 1st integrated circuit 62 includes a transmit SERDES 162, a receive SERDES 164, the transmit RF module 66 and the receive RF module 68. The receive RF module 68 is operably coupled to receive inbound RF signals 74 and produce therefrom inbound digital signal 76. The receive SERDES 164 converts the inbound digital signal 76 into inbound serial bit stream 80. The transmit SERDES 162 receives outbound serial bit stream 82 and converts it into outbound digital signals 78. The transmit RF module 66 converts the outbound digital signal 78 into outbound RF signal 72.

The 2nd integrated circuit 64 includes a 1st SERDES 166, a 2nd SERDES 168, and the programmable logic fabric 86. The programmable logic fabric 86 is programmed to perform an outbound RF function 88 and an inbound RF function 90. The SERDES module 166 receives outbound digital signals 78 from the programmable logic fabric 86 and produces therefrom the outbound serial bit stream 82. The SERDES module 168 receives the inbound serial bit stream 80 and recaptures the inbound digital signals 76. The programmable logic fabric 86 receives the inbound digital signals 76, performs the inbound RF function 90 thereon to produce presentation data. Such presentation data may be video data, audio data, control data, and/or text data.

Figure 6:
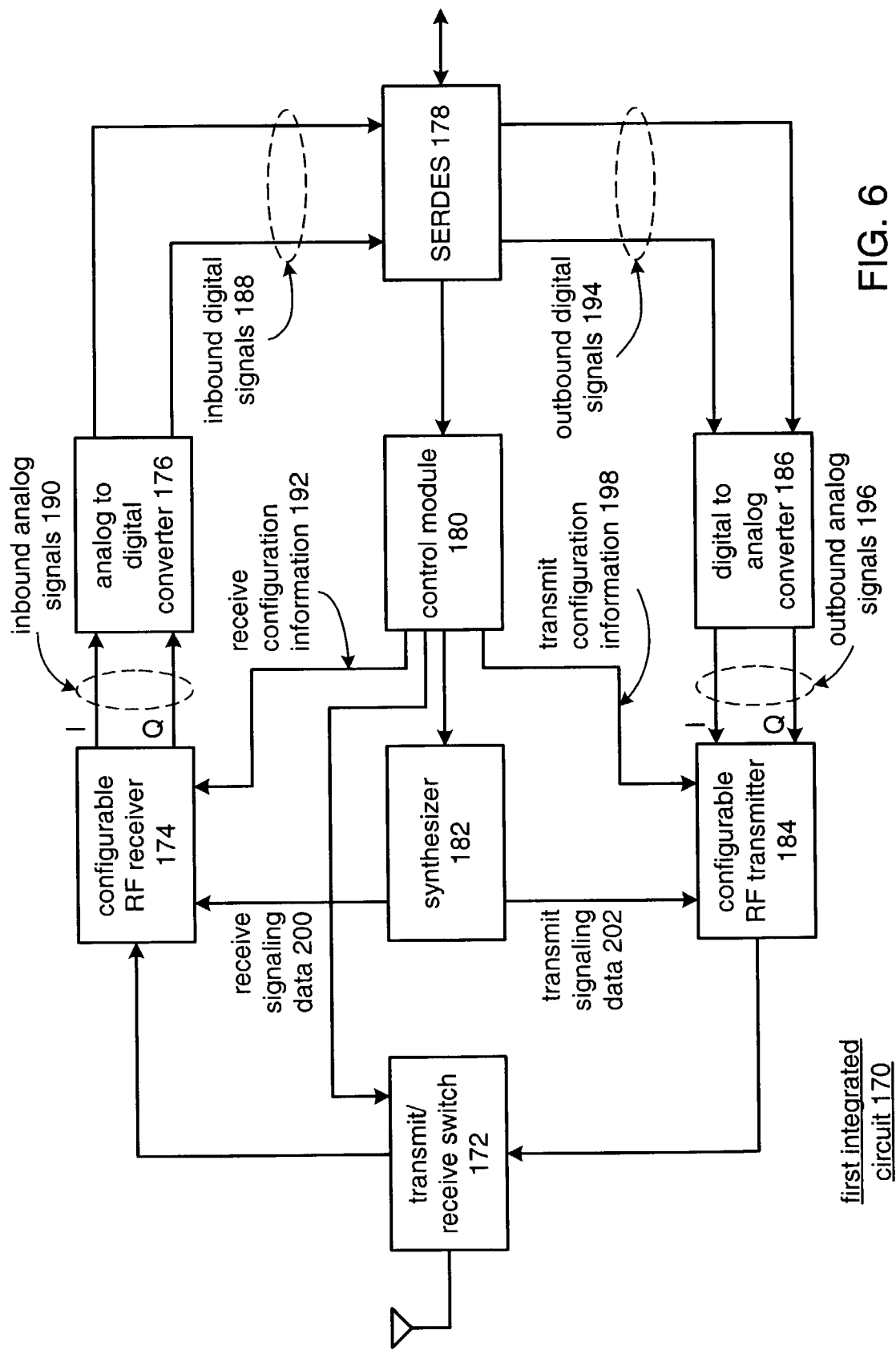
FIG. 6 illustrates a schematic block diagram of a $1^{st}$ integrated circuit of the data conveyance system in accordance with the present invention.

FIG. 6 illustrates a schematic block diagram of an embodiment of the 1st integrated circuit 170. The 1st integrated circuit 170 may be utilized in any one of the data conveyance integrated systems illustrated in FIGS. 2–5. The 1st integrated circuit 170 includes a transmit/receive switch 172, a configurable RF receiver 174, an analog to digital converter 176, SERDES module 178, control module 180, synthesizer 182, configurable RF transmitter 184, and a digital to analog converter 186.

In operation, the SERDES module 178 receives a stream of control bits from the 2nd integrated circuit. The SERDES module 178 recaptures control information from the stream of control bits and provides the control data to control module 180. The control module 180 generates receive configuration information 192 and transmit configuration information 198 from the control data. The control module 180 provides the receive configuration information 192 to the configurable RF receiver 174, which causes the receiver 174 to configure at least one of its operational parameters. The operational parameters include the carrier frequency of the inbound RF signals, the conversion ratio between the carrier frequency and an intermediate frequency, selection of the intermediate frequency, the bandwidth of the receive channel, filter coefficients, and/or power settings.

The control module 180 provides the transmit configuration information 198 to the configurable RF transmitter 184, which causes the configurable RF transmitter 184 to configure one or more of its operational parameters. The operational parameters includes the transmit carrier frequency, the intermediate frequency to the carrier frequency ratio, the transmit power level, filter coefficients, et cetera.

The control module 180 also generates a selection signal based on the control data, wherein the selection signal is provided to the transmit/receive switch 172. Accordingly, the transmit/receive switch 172 provides connectivity to either the configurable RF receiver 174 or the configurable RF transmitter 184 based on the selection signal. As one of average skill in the art will appreciate, the transmit/receive switch 172 may be omitted if a separate receive antenna is utilized to couple inbound RF signals to the configurable RF receiver 174 and a separate transmit antenna is couple to the configurable RF transmitter 184.

The control module 180 also generates control information based on the control data, which is provided to synthesizer 182. Based on the control information, the synthesizer 182 generates receive signaling data 200 and/or transmit signaling data 202. The transmit signaling data includes filtering characteristics, synthesized filtering, echo cancellation and/or generation of intermediate frequencies to be utilized by the configurable RF transmitter 184. Similarly, the receive signaling data 200 includes filtering coefficients, synthesized filtering, echo cancellation, and/or generation of intermediate frequencies to be utilized by the configurable RF receiver 174. As such, based on control data received from the $2^{nd}$ integrated circuit, the $1^{st}$ integrated circuit 170 may be configured to receive a variety of wireless communications and/or transmit a variety of wireless communications in accordance with a variety of RF conventions.

When the transmit/receive switch 172 is configured to receive inbound RF signals, the inbound RF signals are provided to the configurable RF receiver 174. The configurable RF receiver 174 generates inbound analog signals 190. The inbound analog signals may represent the I and Q values of the inbound RF signal at the intermediate frequency, carrier frequency, and/or base band frequency. Alternatively, the configurable RF receiver 174 may output multi-bit samples or delta modulation data that represent the inbound RF signals.

The analog to digital converter 176 converts the inbound analog signals 190 into inbound digital signals 188. The inbound digital signals 188 are converted into a portion of the serial bit stream by SERDES module 178 that is provided to the $2^{nd}$ integrated circuit.

SERDES module 178 receives an outbound serial bit stream from the $2^{nd}$ integrated circuit and reproduces the outbound digital signals 194. The outbound digital signals 194 may represent the I and Q values of a radio signal. The digital to analog converter 186 receives the outbound digital signals 194 and produces outbound analog signals 196. The configurable RF transmitter 184 converts the outbound analog signals 196 into outbound RF signals. The conversion by the RF transmitter 184 may be converting the outbound analog signals from a base band frequency, intermediate frequency, or carrier frequency to the carrier frequency of the outbound RF signals.

As one of average skill in the art will appreciate, the $1^{st}$ integrated circuit 170 may have a plurality of taps for monitoring and/or testing the performance of the $1^{st}$ integrated circuit. For example, the output of the configurable RF receiver 174 may be tapped, the input of the configurable RF transmitter 184 may be tapped, the input to the synthesizer may be tapped and/or include additional inputs, et cetera.

Figure 7:
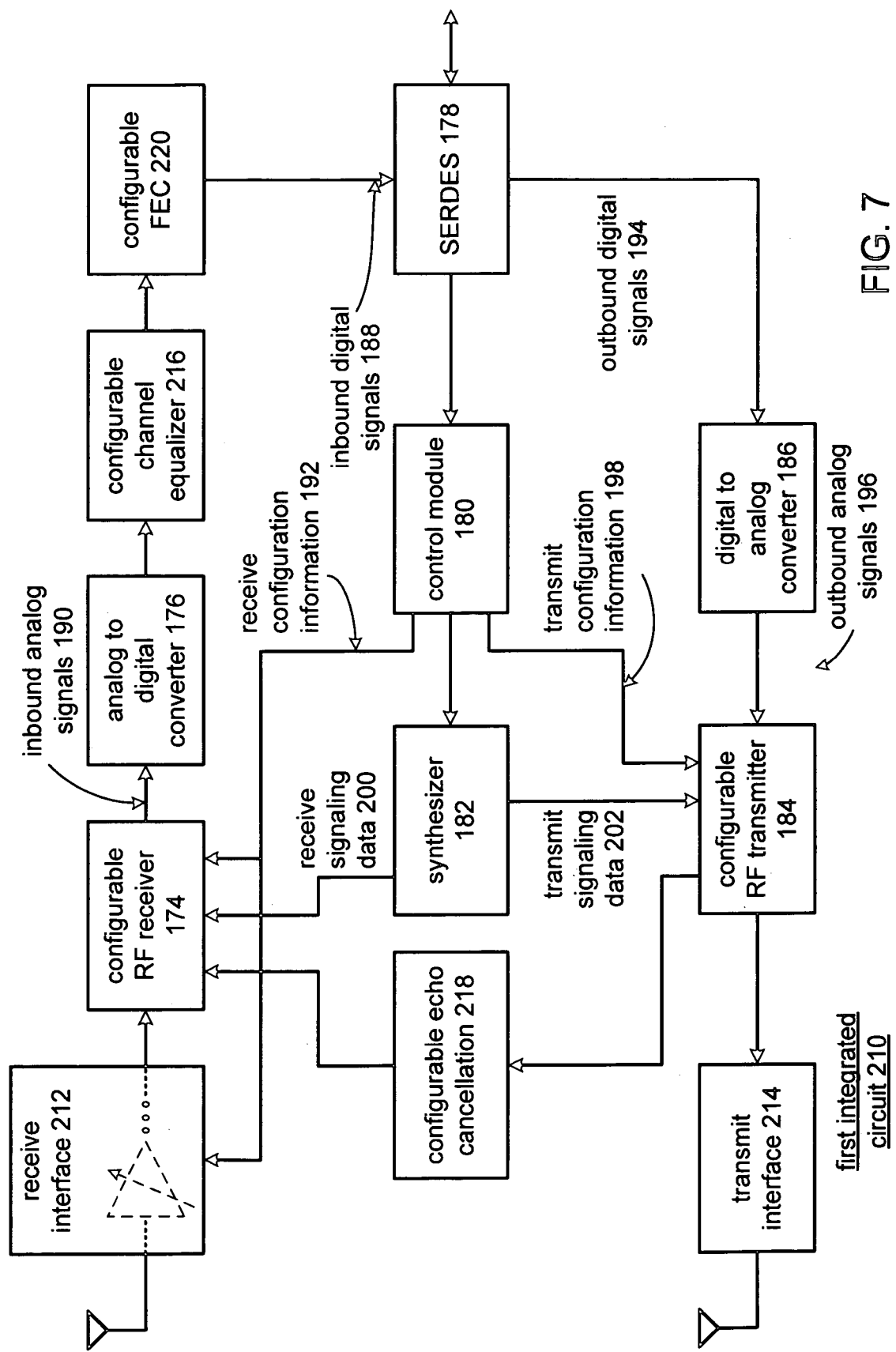
FIG. 7 illustrates a schematic block diagram of an alternate $1^{st}$ integrated circuit of the data conveyance system in accordance with the present invention.

FIG. 7 illustrates a schematic block diagram of a $1^{st}$ integrated circuit 210. The $1^{st}$ integrated circuit 210 may be used as the $1^{st}$ integrated circuit in any one of the data conveyance integrated systems shown in FIGS. 2–5. The $1^{st}$ integrated circuit 210 includes a receive interface 212, a configurable RF receiver 174, the analog to digital converter 176, a configurable channel equalizer 216, a configurable forward error correction module 220, the SERDES module 178, the control module 180, the synthesizer 182, a configurable echo cancellation module 218, the digital to analog converter 186, the configurable RF transmitter 184 and a transmit interface 214. The control module 180, and synthesizer 182 perform as previously described with reference to FIG. 6.

The receive interface 212 provides connectivity between a receive antenna and the configurable RF receiver 174. The receive interface 212 may include an adjustable amplification stage that is programmed via the control module 180, or simply include buffering. The configurable RF receiver 174 converts the received RF signals into inbound analog signals 190. The analog to digital converter 176 converts the inbound analog signals 190 into inbound digital signals 188.

A configurable channel equalizer 216 and/or a configurable forward error correction module 220 may further process the inbound digital signals 188. The configurable channel equalizer 216 is programmed via the control module to equalize and/or compensate for undesirable frequency characteristics of the inbound RF communication path. The configurable forward error correction module 220 provides error correction of data using conventional forward error correction techniques. SERDES module 178 provides the inbound signals 188 as a serial bit stream to the $2^{nd}$ integrated circuit.

The configurable echo cancellation module 218 may provide echo cancellation to the configurable RF receiver 174 such that the RF signals transmitted via the configurable RF transmitter 184 are substantially canceled. Echo cancellation is known in the art, thus no further discussion will be presented except to further illustrate the present invention. The configuration of the echo cancellation 218 will be in accordance with how the configurable RF transmitter 184 is configured.

The configurable RF transmitter is operably coupled to a transmitting antenna via the transmit interface 214. The transmit interface 214 may include an amplification stage and/or a driver to provide the desired power level to the transmit antenna.

As one of average skill in the art will appreciate, SERDES module 178 in FIGS. 6 and 7 utilizes a protocol in accordance with the SERDES module in the $2^{nd}$ integrated circuit to accurately transmit control information, inbound digital signals and outbound digital signals between the two integrated circuits. Such an interface communication may include packetizing the data wherein the packets include headers that identify the particular data packet, the source of the data packet, et cetera, may utilize a time division multiplexing where frames are assigned for transmission of the particular data being transmitted, and/or a proprietary interface that establishes when and how the data is to be exchanged between the SERDES modules within the $1^{st}$ and $2^{nd}$ integrated circuits.

Figure 8:
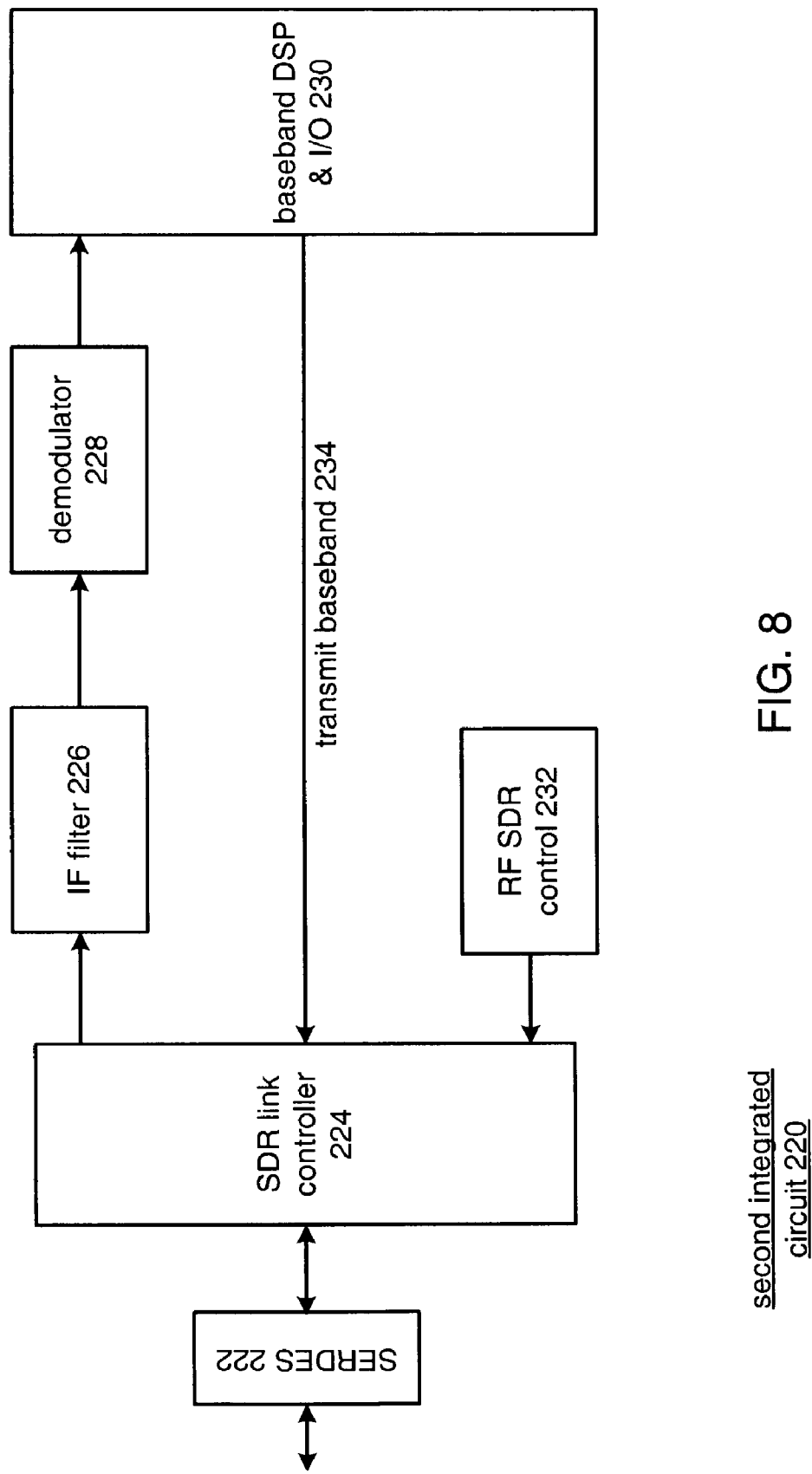
FIG. 8 illustrates a schematic block diagram of the $2^{nd}$ integrated circuit of the integrated data conveyance system in accordance with the present invention.

FIG. 8 illustrates a schematic block diagram of the $2^{nd}$ integrated circuit 220 that may be utilized in any one of the data conveyance integrated systems illustrated in FIGS. 2–5. The $2^{nd}$ integrated circuit 220 includes a SERDES module 222, a software defined link controller 224, an intermediate frequency filter 226, a demodulator 228, a base band digital signal processor (DSP) and input/output module 230 and a radio frequency software defined control module 232. The base band DSP and input/output module 230 performs the inbound RF functions 90 and outbound RF functions 88 based on the particular RF convention being utilized. The input/output functionality of module 230 provides the connectivity to enable data to be inputted and/or outputted from the device containing the $2^{nd}$ integrated circuit 220. Accordingly, the base band DSP produces transmit base band data 234, which represents the outbound digital signals. The transmit base band data 234 is provided to the software defined radio link controller 224.

The software defined radio link controller 224, based on inputs from the radio frequency software defined radio controller 232, coordinates the transmission and reception of information via the SERDES module 222. As such, the link controller 224 coordinates the transmission of the transmit base band signals 234, the reception of the inbound digital signals, and the transmission of the control signals generated by controller 232.

The control signals generated by 232 cause the $1^{st}$ integrated circuit to configure the transmit and receive paths as previously described with reference to FIGS. 6 and 7.

The software defined link controller 224 provides the inbound digital signals to the intermediate frequency filter 226, which filters the signals down to a base band frequency. The filtered signals are then demodulated by demodulator 228 to produce base band inbound signals. The base band DSP processes the inbound base band signals to produce output data for presentation to the user of the device and/or for processing by the base station. As one of average skill in the art will appreciate, the IF filter 226 may be omitted if the $1^{st}$ integrated circuit converts the inbound RF signals to the base band frequency.

The preceding discussion has presented a radio transceiver architecture that includes at least two integrated circuits. One of the integrated circuits converts signals between radio frequencies and digital words, while the other integrated circuit performs radio functions via digital signal processing within programmable logic. The two integrated circuits are interconnected via a high-speed digital serial link, upon which representations of the data contained in the radio frequency signals are transmitted in both directions. The serial link also transmits control signals between the two integrated circuits, where the control signals modify the operational parameters of the radio functions performed by the $1^{st}$ integrated circuit. As one of average skill in the art will appreciate, other embodiments may be derived from the teaching of the present invention without deviating from the scope of the claims.

What is claimed is:

1. A data conveyance system comprises:
   first integrated circuit that includes:
   transmit radio frequency module operably coupled to convert outbound digital signals into outbound radio frequency (RF) signals and to transmit the outbound RF signals;
   receive radio frequency module operably coupled to receive inbound RF signals and to convert the inbound RF signals into inbound digital signals; and
   first serial-deserial (SERDES) module operably coupled to convert the inbound digital signals into an inbound serial bit stream and to receive an outbound serial bit stream and to convert the outbound serial bit stream into the outbound digital signals;
   second integrated circuit that includes:
   second SERDES module operably coupled to convert the inbound serial bit stream back into the inbound digital signals and to convert the outbound digital signals into the outbound serial bit stream; and
   programmable logic fabric operably coupled to receive the inbound digital signals and to manipulate the inbound digital signals based on programming instructions that configure at least a portion of the programmable logic fabric to perform a desired inbound RF function and to generate the outbound digital signals based on the programming instructions that configure at least a second portion of the programmable logic fabric to perform a desired outbound RF function.

2. A wireless communication system comprising:
   a first integrated circuit comprising:
   a configurable radio frequency (RF) receiver for receiving inbound RF signals from a wireless communication link and for outputting inbound analog signals;
   an analog-to-digital converter for converting the inbound analog signals to first digital signals; and
   a first serializer/deserializer circuit operably coupled to convert the first digital signals into a serial bit stream;
   a second integrated circuit coupled to the first integrated circuit, the second integrated circuit comprising:
   a second serializer/deserializer circuit operably coupled to convert the serial bit stream into second digital signals; and
   a programmable logic fabric for receiving and processing the second digital signals.

3. The wireless communication system of claim 2 further comprising:
   a control module coupled to the first serializer/deserializer circuit for receiving control information from the second integrated circuit; and
   receive configuration information generated by the control module for configuring at least one operational parameter of the configurable radio frequency receiver.

4. The wireless communication system of claim 3, wherein the at least one operational parameter is selected from a group consisting of: a carrier frequency of the inbound RF signals, a conversion ratio between the carrier frequency and an intermediate frequency, a selection of the intermediate frequency, a bandwidth of a receive channel, a filter coefficient, and a power setting.

5. The wireless communication system of claim 2 wherein the configurable radio frequency receiver produces multi-bit samples or delta modulation data that represent the inbound RF signals.

6. The wireless communication system of claim 2 wherein the first integrated circuit further comprises:
- a configurable channel equalizer coupled to the analog-to-digital converter, the configurable channel equalizer operably configured to compensate for undesirable frequency characteristics of the wireless communication link for inbound RF signals; and
- a configurable forward error correction module coupled to the configurable channel equalizer for providing error correction for the first digital signals.

7. The wireless communication system of claim 2 wherein the first integrated circuit further comprises: a receive interface, having an adjustable amplification stage, coupled between an antenna and the configurable radio frequency receiver.

8. The wireless communication system of claim 2 wherein the first integrated circuit further comprises: a configurable echo cancellation module operably coupled to the configurable radio frequency receiver to provide echo cancellation to the configurable radio frequency receiver such that RF signals transmitted via a configurable RF transmitter are substantially canceled.

9. The wireless communication system of claim 2 wherein the first integrated circuit further comprises: a synthesizer coupled to the configurable radio frequency receiver for generating signaling data.

10. The wireless communication system of claim 2 wherein the second integrated circuit further comprises a digital signal processor module coupled to a software defined link controller, the software defined link controller coupled to the second serializer/deserializer circuit.

11. The wireless communication system of claim 2 wherein the inbound analog signals represent I and Q values of a radio signal.

12. The wireless communication system of claim 2 wherein the configurable radio frequency receiver is tapped for monitoring or testing performance.

13. A wireless communication system comprising:
- a first integrated circuit comprising:
    - a first serializer/deserializer circuit operably coupled to receive a serial bit stream and to convert the serial bit stream into first digital signals;
    - a digital-to-analog converter for converting the first digital signals to outbound analog signals; and
    - a configurable radio frequency transmitter for receiving the outbound analog signals and transmitting the outbound analog signals over a wireless communication link; and
- a second integrated circuit coupled to the first integrated circuit, the second integrated circuit comprising:
    - a programmable logic fabric for producing second digital signals; and
    - a second serializer/deserializer circuit operably coupled to convert the second digital signals into the serial bit stream.

14. The wireless communication system of claim 13 wherein the first integrated circuit further comprises:
- a control module coupled to the first serializer/deserializer circuit for receiving control information from the second integrated circuit; and
- transmit configuration information generated by the control module for configuring at least one operational parameter of the configurable radio frequency transmitter.

15. The wireless communication system of claim 14, wherein the at least one operational parameter is selected from a group consisting of: a transmit carrier frequency, an intermediate frequency to transmit carrier frequency ratio, a transmit power level, and a filter coefficient.

16. The wireless communication system of claim 14 wherein the first integrated circuit further comprises: a synthesizer coupled between the configurable radio frequency transmitter and the control module for generating transmit transmit signaling data.

17. The wireless communication system of claim 13 wherein the outbound analog signals represent I and Q values of a radio signal.

18. The wireless communication system of claim 13 wherein the first integrated circuit further comprises: a transmit interface, having an adjustable amplification stage, coupled between an antenna and the configurable radio frequency transmitter for providing a power level to a transmit antenna.

19. A method for wireless transmission of data from a base station to a end-user device comprising:
- generating, at least in part, first digital data by a programmable logic device;
- converting the first digital data into a serial bit stream by a first serializer/deserializer circuit;
- receiving the serial bit stream by a second serializer/deserializer circuit via a wired communications link;
- converting the serial bit stream into outbound digital signals;
- receiving the outbound digital signals by a transmit radio frequency module; and
- transmitting radio frequency signals based on the outbound digital signals by the transmit radio frequency module.

20. The method of claim 19 wherein a wireless communication standard used for transmitting the radio frequency signals is selected from a group consisting of: Bluetooth, 802.11b, Local Multipoint Distribution System (LMDS), Microwave Multipoint Distribution System (MMDS), 802.16.3, hiperLAN, 802.11a, CDMA, FDMA, TDMA, PCS, and GSM.

* * * * *